United States Patent [19]
Moore et al.

[11] Patent Number: 5,385,381
[45] Date of Patent: Jan. 31, 1995

[54] VEHICLE ROOFS

[75] Inventors: Donald J. Moore, Wolston; William Bennion, Shoreham By Sea, both of United Kingdom

[73] Assignee: Jaguar Cars Limited, United Kingdom

[21] Appl. No.: 121,229

[22] Filed: Sep. 14, 1993

[30] Foreign Application Priority Data

Oct. 3, 1992 [GB] United Kingdom ............... 9220854

[51] Int. Cl.$^6$ .............................................. B60J 7/08
[52] U.S. Cl. ..................................... 296/117; 296/122
[58] Field of Search ................ 296/107, 117, 118, 122

[56] References Cited

U.S. PATENT DOCUMENTS 2,322,839  6/1943  Falcon .
3,030,140  4/1962  Probst .
5,067,768  11/1991  Fischbach ........................ 296/107

FOREIGN PATENT DOCUMENTS 364774  11/1981  Austria .
530770  9/1956  Canada ............................ 296/107
2661140  10/1991  France .
836677  6/1960  United Kingdom .
995393  6/1965  United Kingdom .

Primary Examiner—David M. Mitchell
Assistant Examiner—Gary C. Hoge
Attorney, Agent, or Firm—Davis, Bujold & Streck

[57] ABSTRACT

A vehicle roof comprises a roof frame and a cover made of flexible material, the roof frame has a pair of main beams each beam extending longitudinally of the vehicle on either side of the passenger compartment, when the roof is erected; the forward ends of the main beams are interconnected by a canopy rail which is adapted to engage and be latched to a windscreen header of the vehicle; at least one bow spans the main beams at a position spaced longitudinally rearwardly of the canopy rail, said bow when the roof is erected extending above the common plane of the main beams; the main beams are hinged at one or more positions along their lengths and linkage mechanisms are provided on each side of the roof frame to control folding of the roof frame as it is moved between an erected and lowered position, power means is provided to move the roof frame between its erected and lowered positions; a linkage mechanaism is provided to retract said bow towards the common plane of the main beams during movement of the roof frame from its lowered to its raised position and to extend the bow above the plane of the main beams to tension the cover when the canopy rail has been latched to the windscreen header.

5 Claims, 2 Drawing Sheets

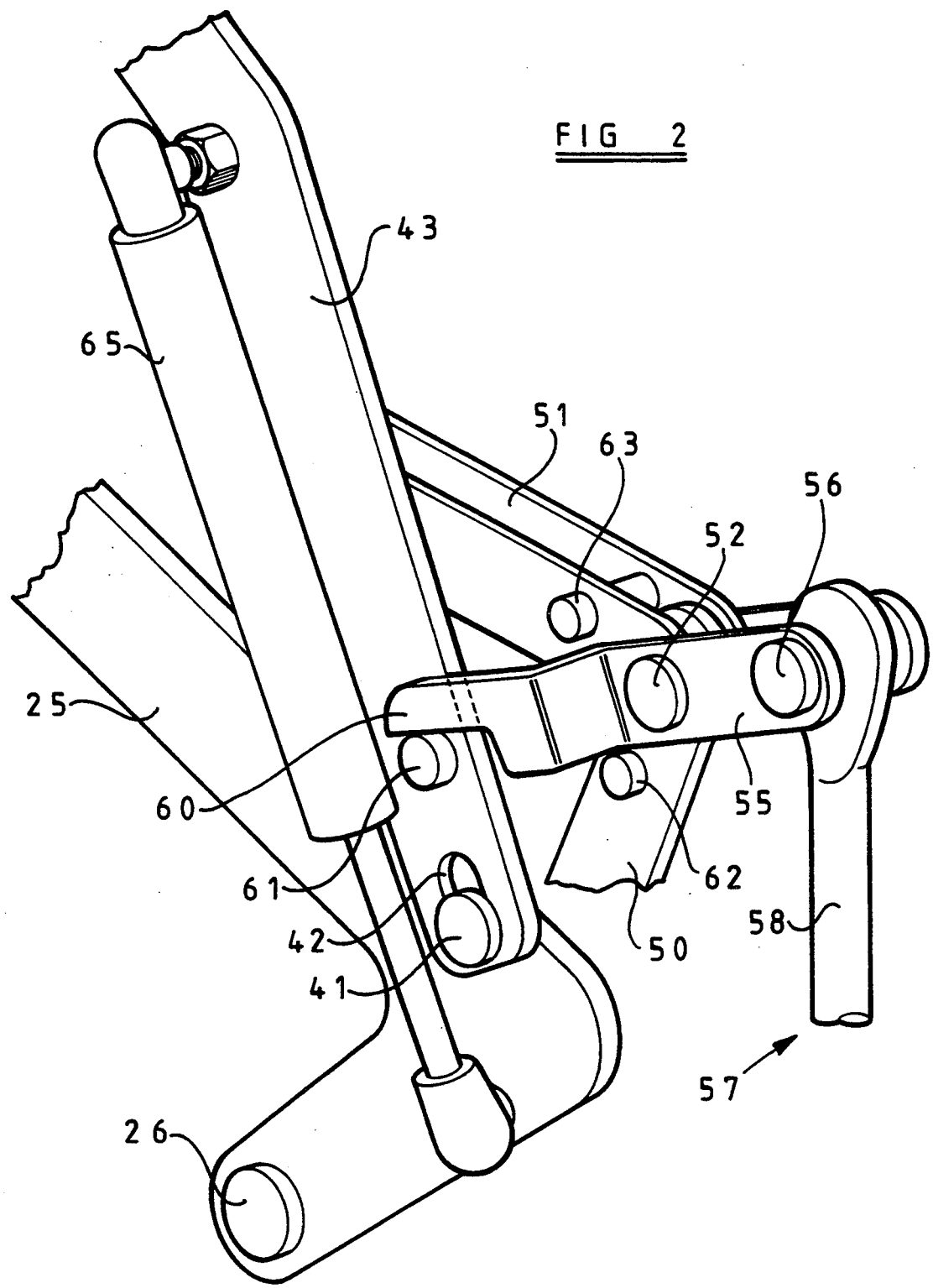

VEHICLE ROOFS

BACKGROUND TO THE INVENTION

The present invention relates to vehicle roofs and in particular to roofs for convertible vehicles.

In conventional convertible roofs for vehicles, the roof which is made from a flexible material is located on a frame. The frame consists of a pair of main beams mounted longitudinally of the vehicle on either side of the passenger compartment, the forward ends of the main beams being interconnected by a transversely extending canopy rail which is adapted to sealingly engage and be latched to the windscreen header when the roof is erected, and two or three bows which span the main beams at longitudinally spaced locations. The flexible roof material is attached at the forward end to the canopy rail and at the rearward end to the vehicle body. The roof lining may be attached to the intermediate bows by webbing.

The main beams are hinged and linkage mechanisms are provided on either side of the roof frame, to control folding of the roof as it is moved from an erected to a lowered position and vice versa. Power means, for example an electric motor or hydraulic ram may be associated with the linkage mechanisms in order to power movement of the roof between its erected and lowered position.

Hitherto, such roofs have been latched manually, lever mechanisms being provided on each main beam, adjacent forward ends thereof. These lever mechanisms include latch means for engagement of the windscreen header, so that the latch means may be engaged with the windscreen header and the lever mechanism actuated to clamp and seal the canopy rail of the roof frame to the windscreen header.

When the roof is erected, it is necessary to tension the flexible roof material, so that it will not be creased and the material will not flap when the vehicle is in motion. In order to achieve this, the roof frame is normally designed so that when it is unfolded and the flexible material untensioned, the canopy rail will stand off the windscreen header and must be pulled down onto the header before it can be latched thereto. The action of pulling the canopy rail down onto the header tensions the roof material.

With powered roofs, it would also be an advantage if the latching mechanism could also be powered so that it can operate automatically. However, in order to do this effectively, the canopy rail of the roof frame must abut or be located in close proximity to the windscreen header when the roof frame is unfolded and the roof material untensioned. The conventional tensioning method cannot consequently be used in such circumstances.

The present invention provides an alternative tensioning means for a convertible vehicle roof of the type disclosed above, which permits the use of automatic powered latching means.

SUMMARY OF THE INVENTION

According to one aspect of the present invention a vehicle roof comprises a roof frame and a cover of flexible material, the roof frame having a pair of main beams, said main beams extending longitudinally of the vehicle on either side of the passenger compartment when the roof is erected, the forward ends of the main beams being interconnected by a canopy rail which is adapted to engage and be latched to the windscreen header of the vehicle, at least one bow spanning the main beams at a position spaced longitudinally rearwardly of the canopy rail, said bow when the roof is erected extending above the common plane of the main beams, said main beams being hinged at one or more positions along their lengths and linkage mechanisms being provided on each side of the roof frame to control folding of the roof frame as it is moved between an erected position and a lowered position, power means are associated with the linkage mechanism for movement of the roof frame between its erected and lowered positions, and means being provided to retract said bow towards the common plane of the main beams during movement of the roof frame from its lowered to its raised position and to extend the bow above the plane of the main beams to tension the cover when the canopy rail of the roof frame has been latched to the windscreen header.

According to a preferred embodiment of the present invention, the bow is retracted by the power means used to move the roof frame between its erected and lowered positions.

BRIEF DESCRIPTION OF THE DRAWINGS

An embodiment of the invention is now described, by way of example only, with reference to the accompanying drawings, in which:

FIG. 2 is an isometric view of a detail of the roof frame illustrated in FIG. 1.

DESCRIPTION OF A PREFERRED EMBODIMENT

Figure 1:
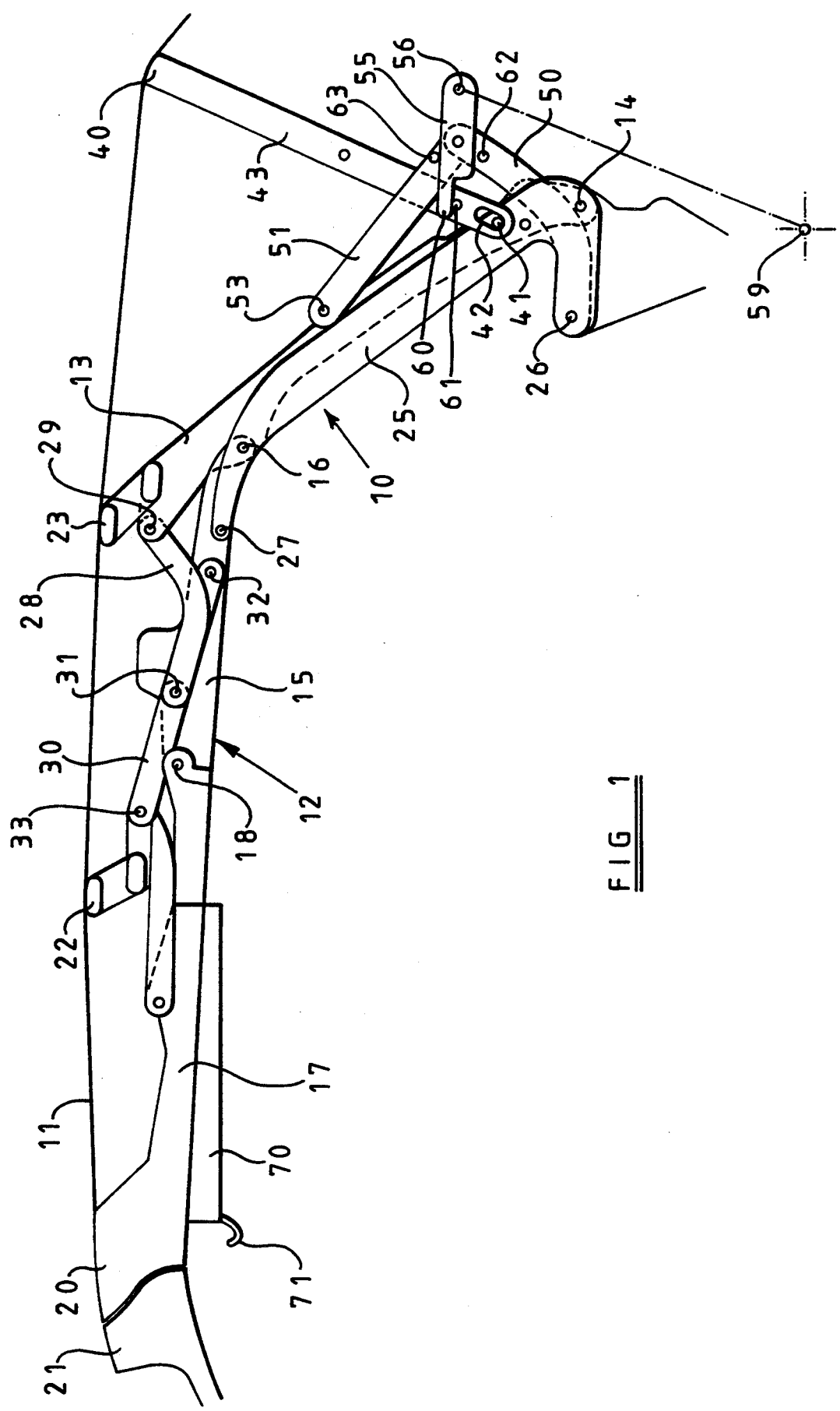
FIG. 1 shows one side of the roof frame of a vehicle roof in accordance with the present invention.

As illustrated in FIG. 1, the roof of a convertible motor vehicle comprises a roof frame 10 with cover 11 made of flexible material.

The roof frame 10 has a pair of main beams 12 which, when the roof is erected as illustrated in FIG. 1, extend longitudinally of the vehicle on either side of the passenger compartment. Each main beam 12 comprises a main strut 13 which is connected at one end to the vehicle body by pivot 14. The main strut 13 is connected adjacent its other end to an intermediate portion 15 of the main beam 12 by pivot 16, the intermediate portion 15 being connected to a forward portion 17 by pivot 18.

The forward ends of the portions 17 of the main beams 12 are interconnected by a transversely extending canopy rail 20. The canopy rail 20 is shaped to engage the windscreen header 21 of the vehicle.

A pair of bows 22 and 23 extend transversely across the main beams 12 spaced rearwardly of a canopy rail 20, the bows 22 and 23 being secured to the forward portions 17 of the main beams 12 and to the ends of the main struts 13, respectively.

Linkage mechanisms 25,28,30 are provided on either side of the roof frame 10 to control folding of the main beams 12, so that as the roof frame 10 is moved from its erected position to its lowered position, the intermediate portions 15 will pivot downwardly about pivots 16 while the forward portions 17 will pivot upwardly about pivots 18. The linkage mechanism 25,28,30 on each side of the roof frame 10, comprises; a main balance link 25 attached to the vehicle body by pivot 26 which is located forwardly of the pivot 14. The other end of the balance link 25 is attached to the intermediate portion 15 of main beam 12 by pivot 27. Link 30 is connected at one end to the intermediate portion 15 of the main beam 12 by pivot 32 and at the other end to the forward portion 17 of the main beam 12 by pivot 33. Link 28 is connected at one end to the main strut 13 by pivot 29 and at the other end to an intermediate point on the link 30 by pivot 31.

A U-shaped rear bow 40 is connected on either side to the main balance link 25 by means of pivot pins 41 which extend through elongate apertures 42 in the legs 43 of the rear bow 40.

The cover 11 is attached at the forward end to the canopy rail 20 and at the rearward end to the vehicle body. The cover 11 is further attached to the bows 22,23 and 40 by webbing, so that as the roof is moved between its erected and lowered positions, movement of the rear bow 40 will be controlled by the cover 11.

On each side of the roof frame 10 an arcuate link is pivotally mounted at one end with respect to the vehicle body on pivot 26. The arcuate link 50 extends rearwardly and upwardly and a further link 51 is connected at one end to the upper end of the arcuate link 50 by pivot 52 and at the other end to the main strut 13 by pivot 53.

A clevis 55 is pivotally connected at a central position, to the links 50 and 51 by means of pivot 52. One end of the clevis 55 is connected by pivot 56 to the arm 58 of a double acting hydraulic ram 57, the other end of the ram 57 being connected to the vehicle body at point 59.

The other end of the clevis 55 extends towards the leg 43 of the rear bow 40 and has a formation 60 adapted to engage a pin 61 on the leg 43, as the roof frame 10 moves between its erected and its lowered positions. Pins 62 and 63 mounted on links 50 and 51 respectively, limit rotary movement of the clevis 55 about the pivot 52.

A gas strut 65 acts between the rear bow 40 and the main balance link 25, biasing the rear bow 40 so that the pivot 41 engages against the outer end of the elongate aperture 42.

The hydraulic rams 57 associated with each side of the roof frame 10 are connected to a common hydraulic motor by which hydraulic fluid may be supplied selectively to either side of each of the rams 57 to raise or lower the roof.

Automatic latch means 70 are mounted at the forward ends of each of the main beams 12. These latch means 70 include latching elements 71 adapted to engage corresponding formations on the windscreen header 21. Power means, for example an electric motor or solenoid, are provided to tighten the latching elements 71 and clamp the canopy rail 20 to the windscreen header 21. Sealing means (not shown) are provided between the canopy rail 20 and windscreen header 21.

With the convertible roof described above, when the roof is erected as illustrated in FIG. 1, the latch means 70 will clamp the canopy rail 20 to the windscreen header 21. The hydraulic rams 57 will be depressurised but extended and the rear bow 40 will be urged outwardly by the gas struts 65, to tension the cover 11.

To lower the roof, the latch means 70 are first released electronically. The hydraulic motor is then energised to supply hydraulic fluid under pressure to the rams 57 to retract arms 58. Movement of the arms 58 will rotate the clevis 55 until it engages pin 63 and will then cause the main strut 13 to pivot clockwise. The lever mechanism 25, 28, 30 causes the main beams 12 to fold in controlled manner, until when the arms 58 are fully retracted, the folded roof is in its lowered position, located to the rearward end of the passenger compartment. The hydraulic motor may then be deactuated allowing the rams 57 to depressurise.

To move the roof from the lowered position to its erected position, the hydraulic motor is actuated to pressurise rams 57 to extend the arms 58. Initially, movement of the arms 58 will cause the clevis 55 to rotate until it engages pin 62. The clevis 55 will then transmit the movement of the arm 58 to the links 50 and 51, causing the main strut 13 to rotate anticlockwise, thereby raising the roof. The linkage mechanism 25, 28, 30 ensures that the roof unfolds correctly. At some point during movement of the roof frame 10 from its lowered position to its erected position, the formation 60 on clevis 55 will engage pin 61 on the leg 43 of the rear bow 40. The formation 60 will then move the leg 43 of the rear bow 40 against the load applied by the gas strut 65, until the rear bow 40 is in a retracted position, in which the pivot 41 engages against the inner end of the elongate aperture 42. This movement of the rear bow 40, will relieve the tension in the roof cover 11, permitting the canopy rail 20 to engage the windscreen header 21 when the roof has been fully unfolded. Under control of, for example a proximity switch, the latch means 70 may then be actuated to latch the canopy rail 20 to the windscreen header 21. Once the latching operation is completed, the hydraulic motor may be de-energised, releasing pressure to the rams 57 so that they may relax, allowing the clevis 55 to rotate away from pin 62 and permitting the rear bow 40 to move outwardly under the influence of the gas struts 65, thereby tensioning the cover 11.

Various modifications may be made without departing from the invention. For example, the means for moving the roof between its erected and lowered positions may alternatively be powered by an electric motor, a suitable linkage mechanism being provided to move the rear bow between its extended and retracted positions during movement of the roof. Furthermore, any suitable biasing means may be used to bias the rear bow towards its extended position.

The latching means may alternatively be positioned on the windscreen header to engage corresponding formations on the canopy rail.

While the tensioning mechanism of the present invention is particularly suitable for converible roofs with automatic powered latching means, it may be used with manually latched roofs.

We claim

1. A vehicle roof comprising a roof frame and a cover of flexible material, the roof frame having a pair of main beams, said main beams extending longitudinally of the vehicle on either side of the passenger compartment when the roof is erected, the forward ends of the main beams being interconnected by a canopy rail which is adapted to engage and be latched to the windscreen header of the vehicle, at least one bow spanning the main beams at a position spaced longitudinally rearwardly of the canopy rail, said bow when the roof is erected extending above the common plane of the main beams, said main beams being hinged at one or more positions along their lengths and linkage mechanisms being provided on each side of the roof frame to control folding of the roof frame as it is moved between an erected position and a lowered position, power means being associated with the linkage mechanisms;

a. for movement of the roof frame between its erected and lowered positions;
b. to retract said bow towards the common plane of the main beams during movement of the roof frame from its lowered to its raised position; and
c. to extend the bow above the plane of the main beams to tension the cover when the canopy rail of the roof frame has been latched to the windscreen header.

2. A vehicle roof according to claim 1 in which said bow has a pair of parallel leg portions interconnected by a transverse portion, the bow being mounted by means of pivots at the extremities of its leg portions, the pivots engaging in elongate apertures to permit movement of the transverse portion of the bow towards and away from the common plane of the main beams, the bow being resiliently biased towards its extended position, a formation being provided on the bow and a complimentary formation being provided on a component of the roof frame, said component of the roof frame moving relative to the bow as the roof frame is moved from its lowered to is raised position, so that the formation on the component will engage the formation on the bow to cause the bow to move to its retracted position, means being provided to release the bow upon latching of the canopy rail to the windscreen header.

3. A vehicle roof according to claim 2 in which the power means comprises a double acting hydraulic ram, the hydraulic ram being connected to the main beam of the roof frame by means of a linkage mechanism, said linkage mechanism having a first link pivotally connected to the vehicle body and second link pivotally connected to the main beam, the first and second links being pivotally connected to one another and to a clevis at a point intermediate with the extremities of the clevis, one end of the clevis being connected to the hydraulic ram and the other end of the clevis providing the formation for engagement of a corresponding formation on the bow, means being provided to limit rotation of the clevis so that at some point during movement of the roof from its lowered to its raised position, the formation on the clevis will engage the formation on the bow and move the bow to its retracted position and, when the roof frame is fully erected and the canopy rail latched to the windscreen header, the clevis may be rotated to permit the bow to move to its extended position.

4. A vehicle roof according to claim 3 in which a separate hydraulic ram and linkage mechanism is associated with each main beam of the roof frame.

5. A vehicle roof according to claim 3 in which after latching of the canopy rail to the windscreen header, the hydraulic ram is depressurised permiting the clevis to rotate and allow the bow to move to its extended position.

* * * * *